United States Patent
Faller et al.

(10) Patent No.: US 8,612,586 B2
(45) Date of Patent: Dec. 17, 2013

(54) NOTIFICATION OF SOCIAL INTERACTIONS WITH A NETWORKING SYSTEM

(75) Inventors: Eric Faller, Palo Alto, CA (US); Rohit Dhawan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 6 days.

(21) Appl. No.: 13/316,292

(22) Filed: Dec. 9, 2011

(65) Prior Publication Data

US 2013/0151607 A1 Jun. 13, 2013

(51) Int. Cl.
*G06F 15/173* (2006.01)

(52) U.S. Cl.
USPC .............. 709/224; 709/200; 709/204

(58) Field of Classification Search
USPC .......................... 709/200, 204, 224
See application file for complete search history.

(56) References Cited

U.S. PATENT DOCUMENTS

| | | | | |
|---|---|---|---|---|
| 7,720,759 B2 * | 5/2010 | Fine et al. | ....................... | 705/40 |
| 7,822,755 B2 * | 10/2010 | Barua et al. | ................... | 707/755 |
| 8,260,253 B2 * | 9/2012 | Maes | ............................. | 455/405 |
| 8,355,955 B1 * | 1/2013 | Mirchandani et al. | ....... | 705/26.1 |
| 2004/0128534 A1 * | 7/2004 | Walker | .......................... | 713/200 |
| 2007/0282959 A1 * | 12/2007 | Stern | .............................. | 709/206 |
| 2008/0052343 A1 * | 2/2008 | Wood | ............................. | 709/202 |
| 2008/0085700 A1 * | 4/2008 | Arora | .......................... | 455/414.3 |
| 2008/0228598 A1 * | 9/2008 | Leff et al. | ....................... | 705/27 |
| 2010/0099060 A1 * | 4/2010 | Bijou | ............................ | 434/107 |
| 2011/0029618 A1 * | 2/2011 | Lavy et al. | ..................... | 709/206 |
| 2011/0161987 A1 | 6/2011 | Huang et al. | | |
| 2011/0258016 A1 * | 10/2011 | Barak et al. | .................. | 705/7.29 |
| 2012/0095976 A1 * | 4/2012 | Hebenthal et al. | ............ | 707/706 |
| 2012/0151359 A1 * | 6/2012 | Mysen et al. | ................. | 715/736 |
| 2012/0226803 A1 * | 9/2012 | Bharadwaj | .................... | 709/224 |
| 2012/0239507 A1 * | 9/2012 | Braginsky | ................... | 705/14.69 |
| 2012/0278475 A1 * | 11/2012 | Papakipos et al. | ............ | 709/224 |
| 2012/0323537 A1 * | 12/2012 | Bocharov et al. | ................ | 703/2 |
| 2013/0049948 A1 * | 2/2013 | Ali | ................................ | 340/501 |
| 2013/0073995 A1 * | 3/2013 | Piantino et al. | ............... | 715/764 |

* cited by examiner

*Primary Examiner* — Anthony Mejia
(74) *Attorney, Agent, or Firm* — Fenwick & West LLP

(57) ABSTRACT

When a social interaction involving a non-user page is detected, a determination is made as to whether to notify an administrator of the page regarding the detected interaction. The determination is made based on a notification policy that describes a variable pattern for communicating with the administrator regarding social interactions. If a determination is made to notify the administrator, a communication is transmitted to the administrator describing the detected interaction.

20 Claims, 3 Drawing Sheets

NOTIFICATION OF SOCIAL INTERACTIONS WITH A NETWORKING SYSTEM

BACKGROUND

Described embodiments relate generally to social networking systems, and in particular to notifying users of social interactions in a social networking system.

Social networking systems provide an environment in which users can connect to and communicate with one another. Entities, such as businesses, organizations, and celebrities have used the popularity of social networking systems to broadcast information to users. One way of broadcasting information is by creating a page within a social networking system. Through the page an entity can make information available to those users who choose to connect with the page.

Typically, an administrator manages the page for the entity and when a user interacts with the page (e.g., posting a message on the page), a communication is transmitted to the administrator to notify the administrator of the interaction.

SUMMARY

Embodiments provide methods, systems, and computer readable storage media for notifying page administrators of social interactions in a social networking system. The social networking system includes one or more non-user pages, each with at least one administrator. When a social interaction involving the non-user page is detected, a determination is made as to whether to notify the administrator regarding the detected interaction. The determination is made based on a notification policy that describes a variable pattern for communicating with the administrator regarding social interactions. If a determination is made to notify the administrator, a communication is transmitted to the administrator describing the detected interaction.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

The embodiments described herein provide systems, methods, and computer readable storage media for notifying a user of social interactions.

A social networking system provides a way for users to connect and communicate with other users. The social networking system allows users to establish relationships or connections with others and share information in a variety of useful ways. A user is a person who has signed up with the social networking system to use the resources of the system, and has an account with the social networking system.

The social networking system also includes non-user pages. A non-user page is a page that represents an entity in the social networking system and is not registered as a user with the system (i.e., does not have a user account). A non-user page may be created for entities such as a business, a location, a company, an organization, an institution, a product, a brand, a group, a public figure, a cause, a community, etc. A non-user page of an entity is used to provide information about the entity to users who choose to connect with the page.

A non-user page has one or more administrators. An administrator is a user of the social networking system that manages the page. The administrator controls some or all of the configuration and the content of the page. Additionally, when a user interacts with the page, for example, by posting a message on the page, a communication may be transmitted to the administrator to notify the administrator of the social interaction. Whether a communication is transmitted is determined based on a notification policy. The notification policy describes a variable pattern of when to transmit a communication to an administrator regarding a social interaction involving the page. For example, a notification policy may describe that for the first ten interactions of a day, a communication is to be sent for each interaction. However, after the first ten interactions, a communication is sent for every twentieth interaction.

Architecture

Figure 1:
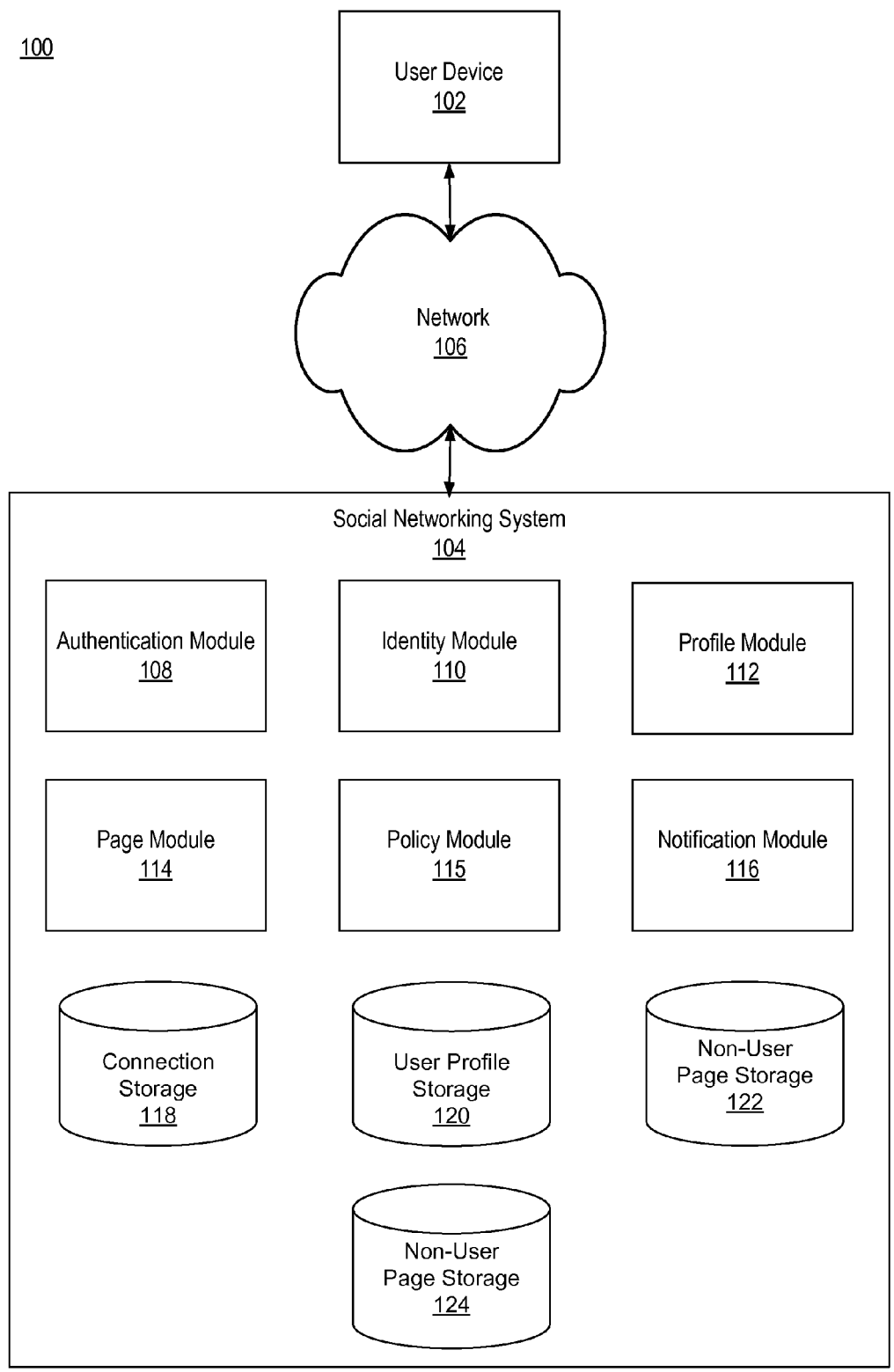
FIG. 1 is a diagram of a social networking environment according to one embodiment.

FIG. 1 is a diagram of a social networking environment 100 according to one embodiment. The environment 100 includes a user device 102 and the social networking system 104 connected by a network 106. For ease of understanding the embodiments described herein, FIG. 1 includes a single user device 102. However, the social networking environment 100 may include many more user devices 102 (e.g., millions of user devices 102).

The network 106 represents the communication pathway between the user device 102 and the social networking system 104. In one embodiment, the network 106 is the Internet and uses standard communications technologies and/or protocols. The network 106 can also utilize dedicated, custom, or private communications links that are not necessarily part of the Internet. The network 106 may comprise any combination of local area and/or wide area networks, using both wired and wireless communication systems.

The user device 102 includes one or more computing devices that can receive inputs from a user and can transmit and receive data via the network 106. For example, a user device 102 may be a desktop computer, a laptop computer, a tablet computer, a mobile phone, a personal digital assistant (PDAs) or any other device including computing functionality and data communication capabilities. The user device 102 is configured to communicate with the social networking system 104 via the network 106.

The social networking system 104 comprises one or more computing devices that store associations that form one or more social networks. Each social network includes multiple users. According to various embodiments, the social networking system 104 may include a website, or alternatively one or more servers that can be accessed through the network 106 by user devices 102.

The social networking system 104 includes an authentication module 108, an identity module 110, a profile module 112, a page module 114, a policy module 115, a notification module 116, a connection storage 118, a user profile storage 120, a non-user page storage 122, and a private information storage 124. In other embodiments, the social networking system 104 may include additional, fewer, or different modules for various applications. Conventional components such as network interfaces, security mechanisms, failover servers, management and network operations consoles, and the like are not shown so as to not obscure the details of the system 104.

The connection storage 118 stores data describing connections between users and non-user pages in the social networking system 104. The connection storage 118 includes defined connections between users, between pages, and between users and pages. Users may select from predefined types of connections, or define their own connection types as needed. In one embodiment, when a user establishes a connection with another user, the users become friends in the system 104. In one embodiment, a user or page establishes a connection with another page by showing affinity towards the other page (e.g., by liking the other page).

The user profile storage 120 stores profiles of users of the social networking system 104. A user profile includes information about its associated user. In one embodiment, user profiles include biographic, demographic, and other types of descriptive information of their respective user, such as work experience, educational history, hobbies, preferences, interests, relationship information, location, and the like. A user profile may additionally include one or more of the following: postings by the user or other users on the profile, a listing of the user's friends, a listing of pages that the user is connected to, and a listing of activities that the user has engaged in through the social networking system 104 (e.g., shared links and videos). The postings may be, for example, multimedia cont (e.g., pictures and videos), messages, comments, status updates, locations, check-ins, liking an object, questions, events, links, and articles.

The non-user page storage 122 stores non-user pages of the social networking system 104. As described above, a non-user page is a page that represents an entity that does not have a user account with social networking system 104. In one embodiment, a non-user page of an entity includes information about the entity. For example, if the entity is a company, the page may include information, such as when the company was founded, the company's headquarters, and the company's mission statement. The page additionally includes postings by administrators on behalf of the page, as well as postings by other pages or users connected to the page. The page may also include information as to users and pages that have a connection with the page and information as to users' interactions with the page. Information is stored with a non-user page indicating which users are administrators of the page.

The private information storage 124 stores private information for users and pages. Private information of a user is information that is unique to the user and is not shared with other users. Private information of a page is unique to the page and only shared with administrators of the page. Private information may include, for example, messages received from users or pages, notifications of relevant social interactions in the social networking system 104, events of the user or page, requests from users or pages to become friends, and a list of users and pages with whom a connection has been established.

The authentication module 108 authenticates users seeking to access content of the social networking system 104. In one embodiment, the authentication module 108 maintains authentication information for each user that has created an account with the system 104. In one embodiment, the authentication information includes a user identifier and a password. In one embodiment, the identifier is the user's email address.

In one embodiment, when a user attempts to communicate with the social networking system 104, if the user is not logged into the system 104, the authentication module 108 presents a login page to the user via the user device 102. In the login page, a user that has previously created an account with the system 104 can enter their respective authentication information. When the authentication information is entered, the authentication module 108 verifies that information is valid. If the information is valid, the user is logged into the social networking system 104. In one embodiment, a user can setup the user device 102 to automatically log them in.

If a person has not previously created an account with the system 104 in the login page the person can request to sign up and become a user of the system 104. If the person request to sign up, the authentication module 108 has the person go through a sign up process.

In one embodiment, the sign up process includes the person providing the authentication module 108 with authentication information that person wishes to use to login, personal information, and information for his or her profile.

The identity module 110 allows a user to change identities in the social networking system 104. If a user is an administrator of one or more non-user pages, the user can select to interact with the system using the identity of the user (i.e., himself) or the identity of a non-user page of which the user is the administrator. The identity module 110 tracks the current identity of the user with system 104.

The social networking information (hereafter "social information") accessible to the user and displayed to the user depends on the identity undertaken by the user. That is, the social information displayed to the user is personalized according to current identity of the user. Social information includes, for example, information of the social networking system 104, such as profile information, page information, connection information, and social interactions. A social interaction is an action performed by a user in the system 104, such as a post or updating a profile.

In one embodiment, when the authentication module 108 authenticates a user and logs the user into the social networking system 104, the user accesses the social networking system 104 under the identity of the user. In one embodiment, the identity module 110 makes accessible to the user private information of the user stored in the private information storage 124. In one embodiment, the private information made accessible includes the user's friend requests, notifications, events, and messages.

If the user, through the user device 102, requests to change identities with the system 104, the identity module 110 identifies pages in the non-user page storage 122 of which the user is an administrator. The identity module 110 displays to the user the pages of which the user is an administrator. If the user requests to undertake the identity of a non-user page, the identity module 110 makes accessible to user the private information of the selected page in the private information storage 124. In one embodiment, the private information includes events of the page, notifications of the page, and information as to the users and pages that have established a connection with the page. Therefore, even though the user is logged into the system 104 as the user, the user is able to undertake the identity of a non-user page without having to provide additional authentication information.

In one embodiment, as long the user's identity in the social networking system 104 is of a non-user page, some or all of the user's own private information is not accessible to the user. The identity module 110 provides the user with the option to change back to the identity of the user.

The profile module 112 manages the creation, access, and update of user profiles. In one embodiment, when a person becomes a user by signing up with the system 104, the profile module 112 creates a profile for the user in the user profile storage 120. The profile module 112 populates the created profile with information provided by the user during the sign up process.

When a user requests access to a profile stored in the user profile storage 120, the profile module 112 determines the current identity of the user in the system 104 from the identity module 110. Based on the identity of the user, the profile module 112 determines the information of the profile accessible to the requesting user. In one embodiment, the profile information accessible to the requesting user depends on the connections between the identity of the requesting user and the user of the requested profile. The profile module 112 retrieves from the user profile storage 120 and transmits to the user device 102 of the requesting user, profile information determined by the module 112 to be accessible by the current identity of the requesting user. The transmitted profile information is displayed to the requesting user.

As an example, assume a user is currently interacting with the system 104 as a non-user page and the user requests the profile of another user. If the non-user page and the other user do not share a direct connection, the profile module 112 may display to the requesting user very limited information from the profile (e.g., a profile picture). On the other hand, if the requesting user is interacting with the system 104 as himself and is a friend of the other user (i.e., the users share a direct connection), the profile module 112 may display the full profile to the requesting user. Thus, the profile information displayed to the requesting user is personalized according the user's current interaction identity within the system 104.

The profile module 112 updates the profiles stored in the user profile storage 120 based on social interactions in the system 104. When a user requests to update his profile with a post or information, the profile module 112 updates the profile in the user profile storage 120 according to the user's request. If a user requests to post on the profile of another user, the profile module 112 determines from the identity module 110 the user's current identity. The profile module 112 updates the profile in the storage 120 according to the request and indicates that the post is by the current identity of the user. For example, if a user is interacting in the system 104 as a non-user page and requests to post a message on another user's profile, the profile module 112 will post the message to the profile and indicate that the post was by the non-user page.

In one embodiment, the profile module 112 monitors for certain social interactions, such as users accepting friend requests and postings on profiles of friends. If a user is involved in a social interaction monitored for, the profile module 112 updates the user's profile in the user profile storage 120. The profile is updated to indicate that the user was involved in the social interaction. For example, if the user accepted another user's friend request, the user's profile may be updated to describe that the user is now friends with the other user.

The page module 114 manages the creation, access, and update of non-user pages. In one embodiment, when a user requests to create a non-user page to represent an entity in the system 104, the page module 114 creates the page in the non-user page storage 122 and populates the page with information provided by the user (e.g., basic information about the entity and pictures). The page module 114 stores with the page an indication that the user is an administrator of the page. At the request of the administrator, the page module 114 can add other users as administrators.

When a user requests access to a non-user page, the page module 114 determines from the identity module 110 the current identity of the user in the system 104. Based on the identity of the user, the page module 114 determines the information of the non-user page accessible to the requesting user. In one embodiment, the profile information accessible to the user depends on the connections between the identity of the user and the non-user page. The page module 114 retrieves from the non-user page storage 122 and transmits to the user device 102, information from the non-user page determined by the module 114 to be accessible by the current identity of the requesting user. The transmitted information is displayed to the user.

The page module 114 updates the non-user pages stored in the non-user page storage 122 based on social interactions in the system 104. When a user requests to post on a page, the page module 114 determines from the identity module 110 the user's current identity. The page module 114 updates the page in the storage 122 according to the request and indicates that the post is by the current identity of the user. If an administrator of a page requests to update the information of the page (e.g., the basic information of the entity the page represents), the page module 114 updates the page in the storage 122 according to the request.

The policy module 115 manages notification policies of non-user pages and users of the social networking system. In one embodiment, the policy module 115 creates a notification policy for each non-user page. A notification policy of a non-user page describes a variable pattern of when to transmit a communication to an administrator of the page regarding social interactions involving the page. The pattern is variable in that the entire pattern is non-sequential. In other words, through the variable pattern, the administrator is not notified after every social interaction involving the page.

The variable pattern may be for a set period of time, such as for one or more days. As an example, assume that the variable pattern of a non-user page is for a period of a day. In this example, under the variable pattern, for the first five social interactions involving the page in a day, a communication is sent to the administrator of the page for each of the social interactions (i.e., five communications are sent). After the first five interactions, a communication is sent to the administrator for every tenth social interaction. The following day, the variable pattern restarts.

In one embodiment, the policy module 115 determines the notification policy for a non-user page based on social information of one or more users of the social networking system 104. In one embodiment, a number of past user social interactions involving the page is social information used by the policy module 115 to determine the notification policy of the page. If the page has a large amount of activity every day (i.e., a large number of users interact with the page on a daily basis), the administrator likely would not want to receive a communication for each social interaction with the page. Therefore, for a page with a large amount of daily activity, a suitable notification policy has a variable pattern where the gap between number of social interactions and a communication being transmitted is large (e.g., a communication is transmitted for every $40^{th}$ social interaction). On the other hand, if the daily activity level on the page is low, the gap may be smaller (e.g., a communication is transmitted for every $5^{th}$ social interaction).

In one embodiment, a number of users that have established a connection with a page is social information used by the policy module 115 to determine the notification policy for the page. The number of users that have a connection with the page can be an indicator of the amount of social interactions that occur with the page. Typically, the more connections with users, the more social interactions with the page. As a result, for a page with a large number of connections, a suitable notification policy may have a variable pattern with a large gap between the number of social interactions and a communication being transmitted.

Other social information that may be used by the policy module 115 to determine the notification policy is the frequency with which the administrator of the page accesses the social networking system 104 either as himself or as the administrator of the page. If the administrator accesses the social networking system 104 often, less communications need to be transmitted to him. Preferences provided by an administrator of the page are other information that may be used by the policy module 115. In one embodiment, the administrator may provide the variable pattern for the notification policy.

In one embodiment, multiple variable patterns are preset by a system administrator and the policy module 115 selects one of preset variable patterns for the notification policy of the page based on the social information described above. For example, assume that the page has 12,000 connections and the policy module 115 is selecting a preset variable pattern for the page based on the page's number of connections. Further, assume that there are three preset variable patterns to select from. Pattern #1 is for pages with less than 10,000 connections, pattern #2 is for pages with connections between 10,001 and 19,999, and pattern #3 is for pages with more than 20,000 connections. In this example, the policy module 115 would select pattern #2 for the page because of the page's 12,000 connections.

The policy module 115 stores a notification policy created for the page so that it can be accessed by the notification module 116 as described below. In one embodiment, the policy module 115 periodically updates the variable pattern of a notification policy based on new social information.

In one embodiment, for a non-user page that has multiple administrators, the policy module 115 may determine a different notification policy for each administrator. In one embodiment, the policy module 115 determines a variable pattern for the notification policy of an administrator based on how frequently the administrator accesses the social networking system 104 and/or preferences provided by the administrator.

In one embodiment, for a non-user page, the policy module 115 may determine a notification policy for each type of social interaction that can occur involving the page. For example, the policy module 115 may determine one notification policy for posts on the page and another notification policy for when users establish a connection with the page. In one embodiment, for a type of social interaction, the policy module 115 determines a variable pattern for the notification policy based on a number of past social interactions of the type involving the page.

In one embodiment, the policy module 115 creates a notification policy for each user of the social networking system 104. In one embodiment, the notification policy of a user is to transmit a communication to the user after every social interaction in the system 115 involving the user (e.g., posts on the profile of the user and the user being mentioned in a post of another user).

In another embodiment, similar to non-user pages, the notification policy of a user describes a non-variable pattern of when to transmit a communication to the user regarding social interactions involving the user. In one embodiment, the policy module 115 determines the variable pattern of a notification policy for a user based on one or more of the following: past social interactions involving the user, a number of connections the user has established with other user and/or pages of the system 104, how frequently the user accesses the system 104, and preferences provided by the user.

The notification module 116 transmits communications to users regarding social interactions. In one embodiment, for each non-user page, the notification module 116 monitors for certain social interactions involving the page. The social interactions monitored for may be, for example, one or more of the following: a post on the page, showing affinity towards a post on the page, and a user establishing a connection with the page.

When the notification module 116 detects a social interaction monitored for, the notification module 116 identifies the notification policy created by the policy module 115 for the page. Based on the variable pattern of the policy, the notification module 116 determines whether to create a communication for the social interaction. The notification module 116 determines whether to create a communication by determining whether the variable pattern indicates that a communication should be transmitted for the detected interaction. If pattern indicates that a communication is to be transmitted, the notification module 116 creates a communication for the interaction. The communication may be, for example, an e-mail message, a Short Message Service (SMS) message, a Multimedia Messaging Service (MMS) message, an instant message, and a voicemail.

Figure 3:
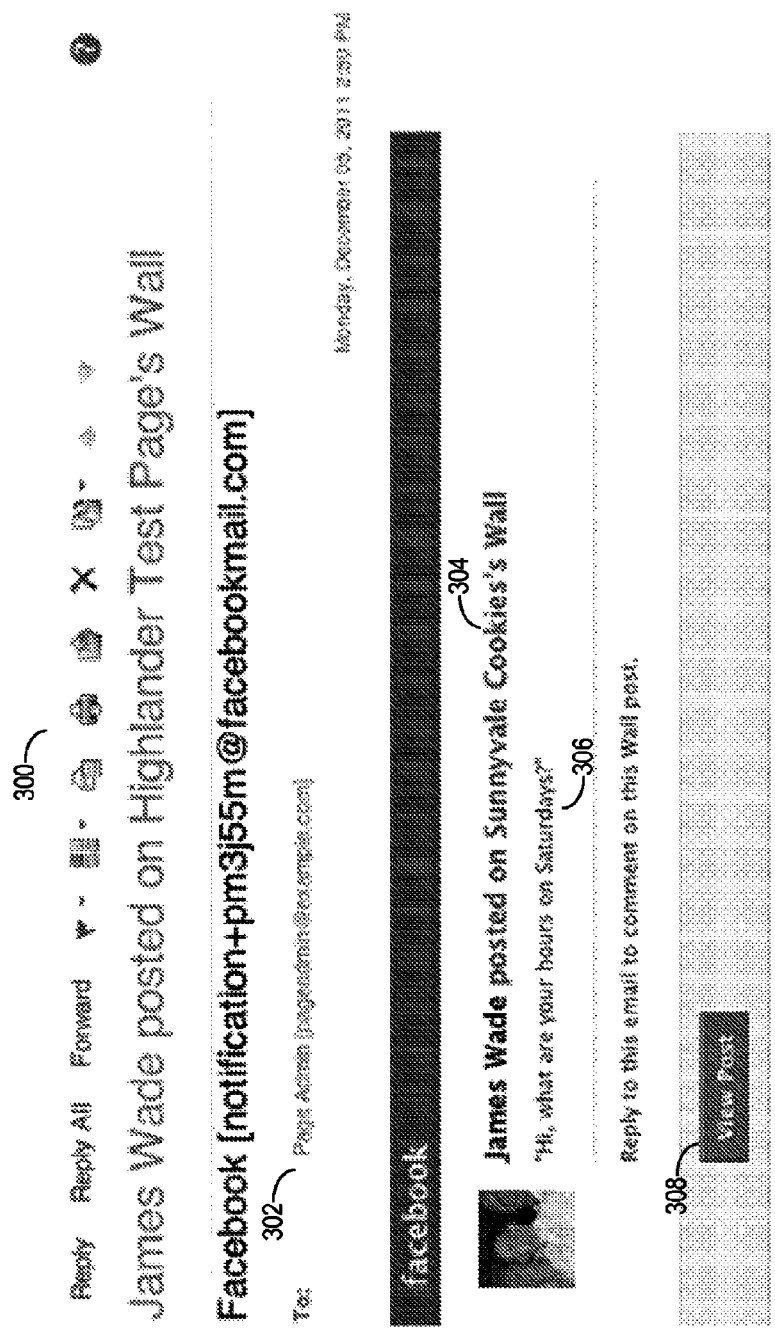
FIG. 3 is an example of a communication transmitted to an administrator of a non-user page according to one embodiment.

The created communication describes the detected social interaction. The notification module 116 transmits the communication to the device 102 of each administrator of the page. FIG. 3 illustrates an example of a communication 300 transmitted to an administrator of a page for a business named Sunnyvale Cookies. In this example, the communication 300 is an e-mail message. The communication 300 is addressed 302 to the administrator and describes 304 that user James Wade posted on the Sunnyvale Cookies page. Additionally, the communication 300 includes the content 306 of the posting. Also, an element 308 is included that if selected links the administrator to the social networking system 104 and allows the administrator to view the post on the page.

In other embodiments, a communication transmitted to an administrator may also summarize one or more prior social interactions for which a communication was not prepared based on the pattern. For example, the communication may state "user James Wade and nine other users posted on the page."

In one embodiment, if the non-user page has multiple administrators and a different notification policy was created for each administrator, the notification module 116 identifies the notification policy of each administrator. For each administrator, the notification module 116 determines whether to transmit a communication for the detected social interaction based on the notification policy of the administrator. If the variable pattern of the policy indicates that a communication is to be transmitted, the notification module 116 creates and transmits the communication to the device 102 of the administrator.

In one embodiment, for each user of the system 104, the notification module 116 monitors for certain social interactions involving the user. The social interactions monitored for may be, for example, one or more of the following: a post on the profile of the user, showing affinity towards a post on the profile, a post in a group the user belongs to, the user being mentioned in a post, another user commenting on a post involving the user, and another user requesting to establish a connection with the user.

When the notification module 116 detects a social interaction monitored for, the notification module 116 identifies the notification policy of the user created by the policy module 115. Based on the notification policy, the notification module 116 determines whether to create a communication for the detected social interaction. If the policy indicates that a communication be created for the interaction, the notification module 116 creates a communication for the interaction and transmits the communication to the device 102 of the user.

Process

Figure 2:
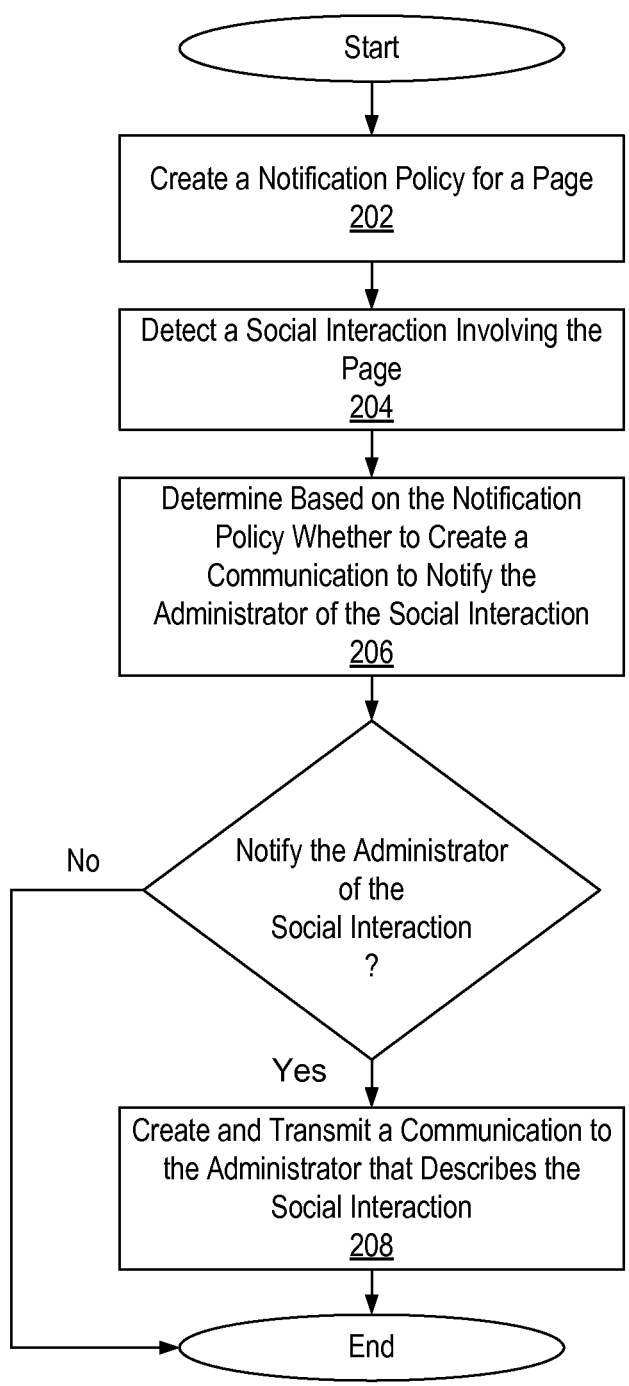
FIG. 2 is a flow diagram of a process for notifying an administrator of a social interaction with a non-user page according to one embodiment.

FIG. 2 is a flow diagram 200 of a process performed by the social networking system 104 for notifying an administrator of a social interaction involving a non-user page according to one embodiment. The social networking system 104 creates 202 a notification policy for the page that describes a variable pattern of when to transmit a communication to an administrator regarding a social interaction involving the page. In one embodiment, the variable pattern for the notification policy is determined based on one or more of the following: past social interactions with the page (e.g., the average number of social interactions per day), a number of users that have established a connection with the page, how often the administrator of the page accesses the system 104, and preferences provided by the administrator.

When the system 104 detects 204 a social interaction involving the page, the system 104 determines 206 based on the notification policy whether to create a communication to notify the administrator of the social interaction. If a determination is made to notify the administrator, the system 104 creates 208 a communication that describes the interaction and transmits the communication to the device of the administrator.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A computer-implemented method comprising:
maintaining a first page of a social networking system, the first page associated with a first administrator with rights to manage content of the first page and different than a second administrator of a second page of the social networking system;
maintaining a plurality of notification policies for the first page, wherein a first notification policy of the plurality defines a first rate of a number of notifications transmitted to the first administrator per detected first type of interactions with the first page and a second notification policy of the plurality defines a second rate of a number of notifications transmitted to the first administrator per detected second type of interactions with the first page that is different from the first type of interactions;
responsive to detecting an interaction by a user of the social networking system with the first page, selecting a notification policy from the plurality of notification policies based on a type of the detected interaction;
determining based on the selected notification policy whether to notify the first administrator about the detected interaction; and
responsive to a determination to notify the first administrator, providing to the first administrator a notification describing the detected interaction.

2. The method of claim 1, wherein the first rate of the first notification policy is determined based on a number of past interactions with the first page of the first type.

3. The method of claim 1, wherein the first rate of the first notification policy is determined based on a number of users of the social networking system that have established a connection with the first page.

4. The method of claim 1, wherein the first rate of the first notification policy is determined based on a frequency with which the first administrator accesses the social networking system.

5. The method of claim 1, wherein the first rate of the first notification policy is determined based on a preference provided by the first administrator.

6. The method of claim 1, wherein the first rate of the first notification policy is provided by the first administrator.

7. The method of claim 1, further comprising:
creating the first notification policy for the first page by selecting the first rate from a plurality of rates, the first rate selected based on social information of one or more users of the social networking system.

8. The method of claim 1, further comprising:
responsive to a plurality of administrators being associated with the first page, creating a notification policy for each of the plurality of administrators; and
responsive to detecting the interaction with the first page, determining, for each of the plurality of administrators, whether to notify the administrator based on the notification policy of the administrator.

9. The method of claim 1, wherein the notification describes prior interactions of which the first administrator has not been notified.

10. The method of claim 1, wherein the first type of interactions are content posts on the first page.

11. The method of claim 1, wherein the first type of interactions are users indicating affinity towards content included in the first page.

12. A computer-implemented method comprising:
maintaining a plurality of notification policies created for a user of a social networking system, wherein a first notification policy of the plurality defines a first rate of a number of notifications transmitted to the user per detected first type of interactions involving the user and a second notification policy of the plurality defines a second rate of a number of notifications transmitted to the user per detected second type of interactions involving the user that is different from the first type of interactions;
responsive to detecting an interaction in the social networking system involving the user, selecting a notification policy from the plurality of notification policies based on a type of the detected interaction;
determining based on the selected notification policy whether to notify the user about the detected interaction; and
responsive to a determination to notify the user, transmitting to the user a notification describing the detected interaction.

13. The method of claim 12, wherein the first rate of the first notification policy is determined based on a number of past interactions involving the user of the first type.

14. The method of claim 12, wherein the first rate of the first notification policy is determined based on a number of additional users of the social networking system that have established a connection with the user.

15. The method of claim 12, wherein the first rate of the first notification policy is determined based on a frequency with which the user accesses the social networking system.

16. The method of claim 12, wherein the first rate of the first notification policy is determined based on a preference provided by the user.

17. The method of claim 12, wherein the first rate of the first notification policy is provided by the user.

18. The method of claim 12, further comprising:
creating the first notification policy for the user by selecting the first rate from a plurality of rates, the first rate selected based on social information of the user.

19. The method of claim 12, wherein the notification describes prior interactions involving the user of which the user has not been notified.

20. A non-transitory computer readable storage medium having computer program instructions, the computer program instructions to configure a processor to perform operations comprising:
maintaining a first page of a social networking system, the first page associated with a first administrator with rights to manage content of the first page and different than a second administrator of a second page of the social networking system;
maintaining a plurality of notification policies for the first page, wherein a first notification policy of the plurality defines a first rate of a number of notifications transmitted to the first administrator per detected first type of interactions with the first page and a second notification policy of the plurality defines a second rate of a number of notifications transmitted to the first administrator per detected second type of interactions with the first page that is different from the first type of interactions;
responsive to detecting an interaction by a user of the social networking system with the first page, selecting a notification policy from the plurality of notification policies based on a type of the detected interaction;
determining based on the selected notification policy whether to notify the first administrator about the detected interaction; and
responsive to a determination to notify the first administrator, providing to the first administrator a notification describing the detected interaction.

* * * * *